United States Patent
Watanabe

(10) Patent No.: US 10,756,540 B2
(45) Date of Patent: Aug. 25, 2020

(54) RECEIVED POWER CONTROL DEVICE AND RECEIVED POWER CONTROL METHOD

(71) Applicant: Panasonic Intellectual Property Management Co., Ltd., Osaka (JP)

(72) Inventor: Kenichi Watanabe, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 137 days.

(21) Appl. No.: 15/775,832

(22) PCT Filed: Nov. 9, 2016

(86) PCT No.: PCT/JP2016/004836
§ 371 (c)(1),
(2) Date: May 13, 2018

(87) PCT Pub. No.: WO2017/085915
PCT Pub. Date: May 26, 2017

(65) Prior Publication Data
US 2018/0331537 A1  Nov. 15, 2018

(30) Foreign Application Priority Data
Nov. 18, 2015  (JP) .................. 2015-226085

(51) Int. Cl.
*H02J 3/14* (2006.01)
*H02J 7/00* (2006.01)
(Continued)

(52) U.S. Cl.
CPC ............. *H02J 3/14* (2013.01); *H02J 3/32* (2013.01); *H02J 3/38* (2013.01); *H02J 7/0047* (2013.01);
(Continued)

(58) Field of Classification Search
CPC .. H02J 3/14; H02J 7/0047; H02J 13/00; H02J 3/38; H02J 3/32; H02J 2003/143;
(Continued)

(56) References Cited

U.S. PATENT DOCUMENTS

2010/0235008 A1* 9/2010 Forbes, Jr. ............. G06Q 10/00
700/291
2011/0260546 A1* 10/2011 Hashizume ............. B60K 6/46
307/75

(Continued)

FOREIGN PATENT DOCUMENTS

| JP | 61-17220 | 1/1986 |
|---|---|---|
| JP | 2012-95424 | 5/2012 |

(Continued)

OTHER PUBLICATIONS

International Search Report (ISR) dated Jan. 17, 2017 in International (PCT) Application No. PCT/JP2016/004836.
(Continued)

*Primary Examiner* — Jigneshkumar C Patel
(74) *Attorney, Agent, or Firm* — Renner, Otto, Boisselle & Sklar, LLP

(57) ABSTRACT

A received power control device (200) that performs control of received energy, which is an amount of power received from a power system per predetermined time at a power receiving point to which a load (302) and an electric storage device (303) are electrically connected, the received power control device (200) performing the control by controlling charge and discharge of at least the electric storage device (303), including: a received energy obtainer (201) that periodically obtains information indicating the received energy; a controller (202) that causes at least the electric storage device (303) to discharge to prevent the received energy from exceeding a first threshold; a remaining capacity obtainer (203) that periodically obtains information indi-
(Continued)

cating a remaining capacity of the electric storage device (303); and a threshold setter (204) that increases the first threshold when an amount of decrease in the remaining capacity per unit time exceeds a second threshold.

13 Claims, 9 Drawing Sheets

(51) Int. Cl.
  *H02J 3/32* (2006.01)
  *H02J 3/38* (2006.01)
  *H02J 13/00* (2006.01)
(52) U.S. Cl.
  CPC ............ *H02J 13/00* (2013.01); *H02J 7/0048* (2020.01); *H02J 2310/14* (2020.01); *Y02B 70/3225* (2013.01); *Y02B 70/3266* (2013.01); *Y04S 20/222* (2013.01); *Y04S 20/242* (2013.01)
(58) Field of Classification Search
  CPC .............. H02J 2007/005; Y04S 20/242; Y04S 20/222; Y02B 70/3225; Y02B 70/3266
  USPC ........................................................ 700/286
  See application file for complete search history.

(56) References Cited

U.S. PATENT DOCUMENTS

| | | | | |
|---|---|---|---|---|
| 2013/0264865 | A1* | 10/2013 | Sugeno | H02J 3/32 307/9.1 |
| 2014/0012426 | A1 | 1/2014 | Funakubo | |
| 2014/0225445 | A1* | 8/2014 | Hanada | H02J 3/32 307/81 |
| 2015/0303690 | A1 | 10/2015 | Miyazaki et al. | |
| 2017/0267118 | A1* | 9/2017 | Akashi | H02J 7/16 |

FOREIGN PATENT DOCUMENTS

| | | |
|---|---|---|
| JP | 2013-143867 | 7/2013 |
| JP | 2014-147216 | 8/2014 |
| WO | 2012/127595 | 9/2012 |

OTHER PUBLICATIONS

Extended European Search Report dated Aug. 28, 2018 for corresponding EP Application No. 16865919.1.

* cited by examiner

RECEIVED POWER CONTROL DEVICE AND RECEIVED POWER CONTROL METHOD

TECHNICAL FIELD

The present invention relates to a received power control device, etc. that control received energy by controlling the charge and discharge of an electric storage device.

BACKGROUND ART

A technique has been proposed that controls received energy by controlling the charge and discharge of an electric storage device. PTL 1 discloses an example of such technique.

More specifically, the controller disclosed in PTL 1 calculates a target value such that the total energy, out of predicted energy consumption, that exceeds the target value is less than or equal to the amount of power discharged from a storage battery. The controller controls the discharge of the storage battery on the basis of such target value, while measuring the energy consumed by a load. This allows for the reduction in the peak value of power supplied from a commercial power source.

CITATION LIST

Patent Literature

PTL 1: Japanese Unexamined Patent Application Publication No. 2014-147216

SUMMARY OF THE INVENTION

Technical Problem

However, the technique disclosed in PTL 1 calculates the target value on the basis of the predicted energy consumption. As such, when the energy consumption is predicted to be low, the resulting target value is also calculated to be low. Consequently, when the actual energy consumption is higher than the predicted energy consumption, the amount of power discharged from the storage battery will be greater than estimated, which can result in the storage battery having an insufficient remaining capacity.

In view of the above, the present invention aims to provide a received power control device, etc. that are capable of appropriately controlling received energy.

Solutions to Problem

To achieve the above object, the received power control device according to one aspect of the present invention is a received power control device that performs control of received energy, which is an amount of power received from a power system per predetermined time at a power receiving point to which a load and an electric storage device are electrically connected, the received power control device performing the control by controlling charge and discharge of at least the electric storage device, the received power control device comprising: a received energy obtainer that periodically obtains information indicating the received energy; a controller that causes at least the electric storage device to discharge to prevent the received energy from exceeding a first threshold; a remaining capacity obtainer that periodically obtains information indicating a remaining capacity of the electric storage device; and a threshold setter that increases the first threshold when an amount of decrease in the remaining capacity per unit time exceeds a second threshold.

Also, the received power control method according to another aspect of the present invention is a received power control method for performing control of received energy, which is an amount of power received from a power system per predetermined time at a power receiving point to which a load and an electric storage device are electrically connected, the received power control method being intended for performing the control by controlling charge and discharge of at least the electric storage device, the received power control method comprising: periodically obtaining information indicating the received energy; causing at least the electric storage device to discharge to prevent the received energy from exceeding a first threshold; periodically obtaining information indicating a remaining capacity of the electric storage device; and increasing the first threshold when an amount of decrease in the remaining capacity per unit time exceeds a second threshold.

Advantageous Effect of Invention

The received power control device, etc. according to an aspect of the present invention are capable of appropriately controlling received energy.

DESCRIPTION OF EXEMPLARY EMBODIMENT

The following describes an embodiment of the present invention with reference to the drawings. Note that the following embodiment shows a comprehensive or specific example. The numerical values, shapes, materials, structural components, the arrangement and connection of the structural components, steps, the processing order of the steps, etc. shown in the following embodiment are mere examples, and thus are not intended to limit the present invention. Of the structural components described in the following embodiment, structural components not recited in any one of the independent claims that indicate the broadest concepts of the present invention will be described as optional structural components.

Note that the amount of power, which generally means the integral of power over predetermined time, corresponds to energy, and energy per unit time corresponds to power. Power and energy are interrelated with each other, and thus power is used to mean energy and energy is used to mean power in some cases in this description. Also note that the amount of power is referred to as energy, and that power and energy are used to mean their respective values in some cases. Also, charge and discharge corresponds to at least one of charge and discharge.

Embodiment

The present embodiment describes a received power control device that controls received energy by controlling the charge and discharge of an electric storage device. Bulk power receiving on a housing complex basis or a community basis is envisaged here as a non-limiting example of the power receiving system.

Figure 1:
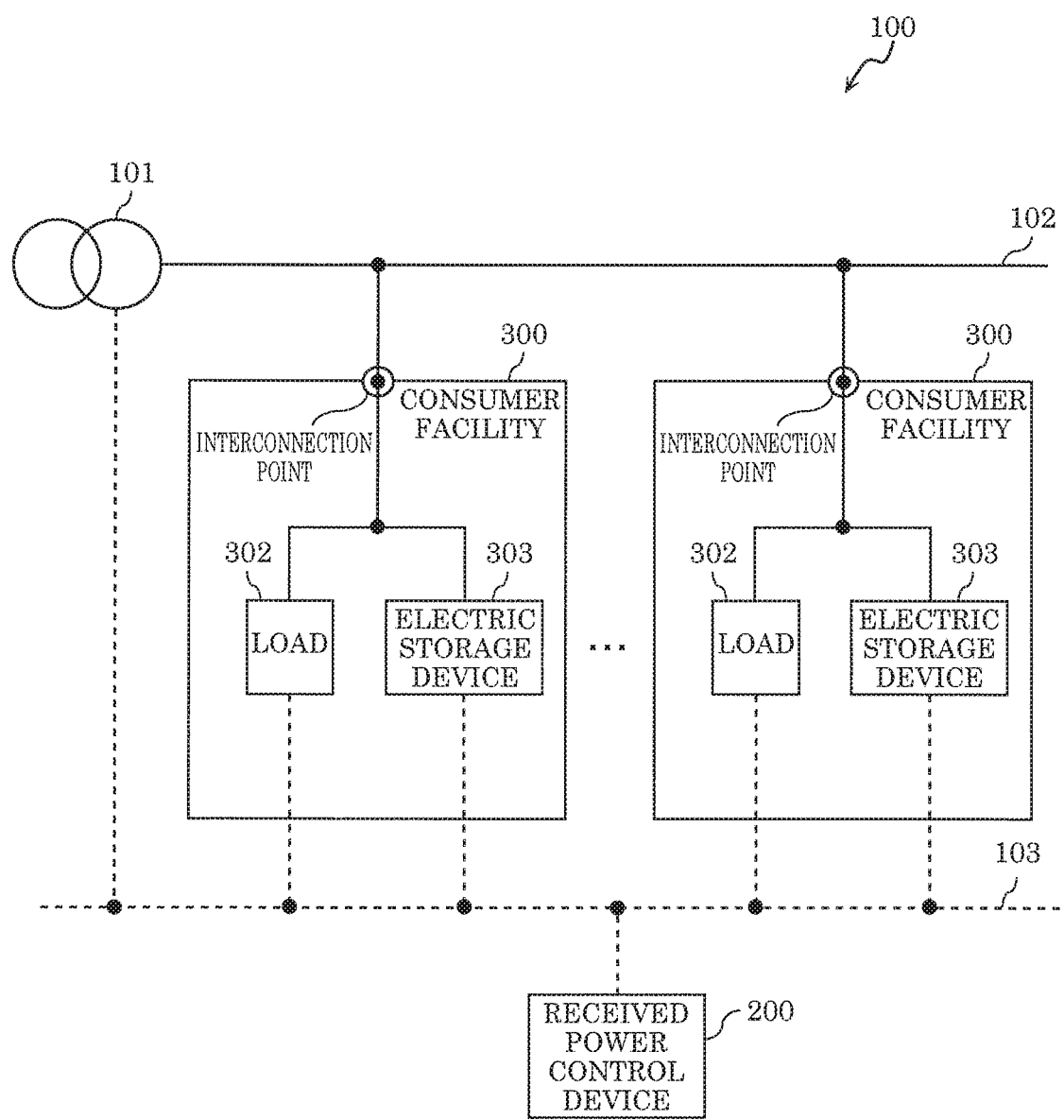
FIG. 1 is a block diagram showing the structure of a power control system according to an embodiment.

FIG. 1 is a block diagram showing the structure of a received power control system that includes the received power control device according to the present embodiment. As shown in FIG. 1, received power control system 100 according to the present embodiment includes transformer 101, distribution line 102, a plurality of consumer facilities 300, communication line 103, and received power control device 200.

Transformer 101 is a transformer that converts the voltage of power supplied from a power system into a voltage appropriate to be supplied to consumer facilities 300. An example of transformer 101 is a high-voltage power receiving facility of a housing complex. Transformer 101 may provide, to received power control device 200, notification of received energy, which is the amount of power received from the power system.

Note that transformer 101 is defined here as a power receiving point to which power from the power system is supplied, but the power receiving point is not limited to transformer 101. For example, interconnection points of consumer facilities 300 may be defined as power receiving points.

Distribution line 102 is a power line that electrically connects transformer 101 and each consumer facility 300, and through which power is supplied from transformer 101 to each consumer facility 300.

Each consumer facility 300 is a facility installed at a consumer property, i.e., each proprietary area of a housing complex, a single-family house, etc. Each consumer facility 300 includes load 302 and electric storage device 303. These structural components of consumer facility 300 are installed at the consumer property. Note that a plurality of consumers may constitute a single high-voltage consumer on a housing complex basis or on a community basis. Stated differently, a plurality of consumers may be integrated into a single high-voltage consumer. Also, a single consumer facility 300 may include a plurality of loads 302 and a plurality of electric storage devices 303. Alternatively, a single consumer facility 300 may include either a plurality of loads 302 or a plurality of electric storage devices 303. A single consumer facility 300 may also include a power generation facility such as a solar power generation device, in addition to a plurality of loads 302 and/or a plurality of electric storage devices 303.

Load 302, which is a device included in each consumer facility 300, consumes power. An example of load 302 is a home-use electronic device. Each consumer facility 300 may include a plurality of loads 302 as described above. Load 302 provides, to received power control device 200, notification of, for example, a reducible amount of power in power consumption. Load 302 also changes the operation mode, on the basis of a command value received from received power control device 200, to reduce power consumption. More specifically, load 302 reduces power consumption by stopping its operation or by operating in power-saving mode.

Electric storage device 303 charges power supplied from the power system. Electric storage device 303 also discharges power to supply it to load 302. Electric storage device 303 includes a storage battery, an inverter, etc. The inverter converts an alternating current (AC) to a direct current (DC) when the storage battery charges power, and converts a DC to an AC when the storage battery discharges power. Electric storage device 303 also provides, to received power control device 200, notification of, for example, the remaining capacity. Electric storage device 303 also charges or discharges power on the basis of a command value received from received power control device 200.

Communication line 103 is a communication line through which electric storage device 303 and received power control device 200 communicate with each other. Examples of communication line 103 include: a wired LAN in conformity with a standard such as IEEE 802.3; a wireless LAN in conformity with a standard such as IEEE 802.11a, b, g; and a public communication channel such as a mobile phone line. Communication line 103 may enable transformer 101 and received power control device 200 to communicate with each other, and may enable load 302 and received power control device 200 to communicate with each other.

Received power control device 200 sets a threshold for the received energy per predetermined time, an example of which is 30 minutes. Received power control device 200 also controls the charge and discharge of electric storage device 303 by calculating a command value for controlling the charge and discharge of electric storage device 303, and then by sending the calculated command value to electric storage device 303. For example, received power control device 200 measures the received energy at transformer 101, which is a power receiving point. Then, received power control device 200 controls the charge and discharge of electric storage device 303 to prevent the received energy per predetermined time from exceeding a first threshold.

More specifically, received power control device 200 estimates received energy over the predetermined time, on the basis of the received energy that has been measured over an elapsed time of the predetermined time. For example, received power control device 200 estimates the received energy over the predetermined time by the following equation:

Received energy over predetermined time=received energy over elapsed time÷elapsed time×predetermined time  (Equation 1)

When the received energy over the predetermined time exceeds the first threshold, received power control device 200 causes electric storage device 303 to discharge. In so doing, received power control device 200 causes electric storage device 303 to discharge power, during the rest of the predetermined time, by an amount that exceeds the first threshold out of the estimated received energy. In this manner, received power control device 200 controls the charge and discharge of electric storage device 303 to prevent the received energy over the predetermined time from exceeding the first threshold.

Note that the above method is only an example, and thus another method may be used to control the charge and discharge of electric storage device 303 to prevent received energy from exceeding the first threshold.

For example, the timing at which received power control device 200 causes electric storage device 303 to discharge is not limited to when the estimated received energy exceeds the first threshold, and thus received power control device 200 may cause electric storage device 303 to discharge when the estimated received energy is likely to exceed the first threshold. More specifically, received power control device 200 may cause electric storage device 303 to discharge when the estimated received energy exceeds 90% of the first threshold. In so doing, received power control device 200 may cause electric storage device 303 to discharge power, during the rest of the predetermined time, by an amount that exceeds 90% of the first threshold out of the estimated received energy. This allows for a more reliable control of the received energy.

That the charge and discharge of electric storage device 303 is controlled to prevent received energy from exceeding the first threshold means that the charge and discharge of electric storage device 303 is controlled to have received energy fall at or below the first threshold. Stated differently, even when the charge and discharge of electric storage device 303 is controlled to prevent the received energy from exceeding the first threshold, an error between the received energy over the predetermined time calculated by Equation 1 and the actual received energy cusses the received energy to exceed the first threshold in some cases.

Received power control device 200 also measures, for example, the remaining capacity (state of charge: SOC) of electric storage device 303. Received power control device 200 then updates the first threshold, on the basis of the received energy at the power receiving point and the remaining capacity of electric storage device 303.

Also, received power control device 200 may obtain, for example, the received energy at a plurality of interconnection points of a plurality of consumer facilities 300 to utilize the total received energy of a plurality of interconnection points as the received energy at the power receiving point. This method of utilizing the total received energy of a plurality of interconnection points is especially suitable for the case where no facility other than consumer facilities 300 is provided at the secondary side of transformer 101 and where high-voltage bulk power receiving is not employed.

Also, received power control device 200 may control the power consumption of load 302 by calculating a command value for controlling the power consumption of load 302, and then by sending the calculated command value to load 302. For example, received power control device 200 controls the power consumption of load 302 to prevent the received energy per predetermined time from exceeding the first threshold. More specifically, received power control device 200 controls the power consumption of load 302 within the reducible amount of power in power consumption, by causing load 302 to stop operating or by causing load 302 to operate in power-saving mode.

Note that electric storage device 303 is included in each consumer facility 300 in the present embodiment, but a single electric storage device 303 may be installed in a common use area of the housing complex or in the community. Alternatively, received power control device 200 may be included in electric storage device 303, or electric storage device 303 may be included in received power control device 200. Stated differently, received power control device 200 and electric storage device 303 may take an integrated form.

Also note that received power control system 100 may include only at least any one of a plurality of structural components shown in FIG. 1. For example, received power control system 100 may include only received power control device 200 and a plurality of electric storage devices 303 among the structural components shown in FIG. 1. In this case, a system other than received power control system 100 may include the other structural components.

Figure 2:
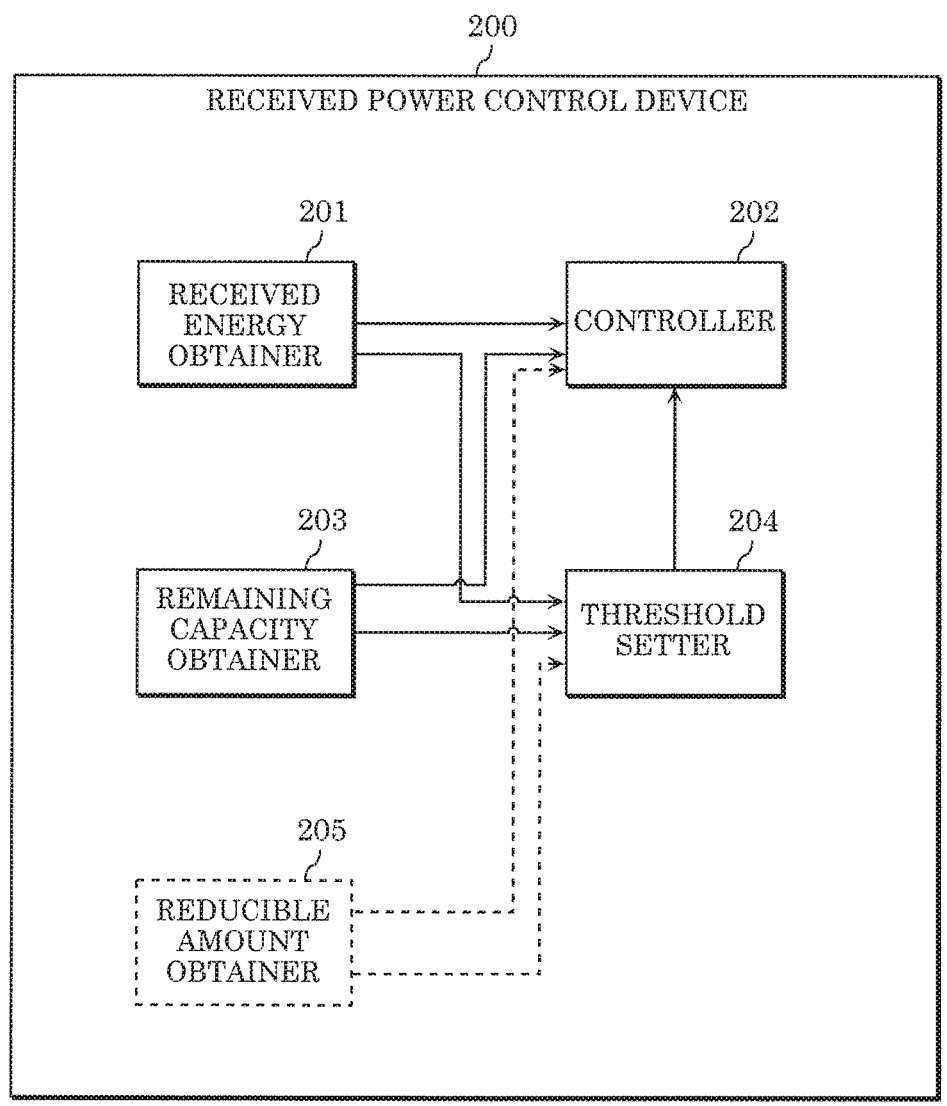
FIG. 2 is a block diagram showing the structure of a received power control device according to the embodiment.

FIG. 2 is a block diagram showing the structure of received power control device 200 shown in FIG. 1. As shown in FIG. 2, received power control device 200 includes received energy obtainer 201, controller 202, remaining capacity obtainer 203, and threshold setter 204. Received power control device 200 may further include reducible amount obtainer 205.

Received energy obtainer 201 periodically obtains information indicating the received energy at the power receiving point. For example, received energy obtainer 201 obtains, every five minutes, information indicating the received energy over the past five minutes. Received energy obtainer 201 calculates a total value of the received energy at a plurality of interconnection points where necessary. Subsequently, received energy obtainer 201 sends the information indicating the received energy at the power receiving point to controller 202 and threshold setter 204.

Controller 202 controls the received energy at the power receiving point by controlling the charge and discharge of each electric storage device 303 within the bounds of the remaining capacity of electric storage device 303. Stated differently, controller 202 regulates the received energy at the power receiving point by regulating the charge and discharge of each electric storage device 303.

For example, controller 202 controls the charge and discharge of each electric storage device 303 by calculating, every five minutes, a command value for controlling the charge and discharge of electric storage device 303, and then by sending the calculated command value to electric storage device 303. More specifically, controller 202 controls the charge and discharge of each electric storage device 303 to prevent received energy at the power receiving point per predetermined time from exceeding the first threshold.

Controller 202 may control the received energy at the power receiving point by controlling the power consumption of each load 302 within the reducible amount of power consumed by load 302. Stated differently, controller 202 may regulate the received energy at the power receiving point by regulating the power consumption of each load 302. Controller 202 may perform the control of the charge and discharge of electric storage device 303 and the control of power consumption of load 302 in parallel.

Remaining capacity obtainer 203 obtains information indicating the remaining capacity of each electric storage device 303. For example, remaining capacity obtainer 203 obtains, every five minutes, the remaining capacity of each electric storage device 303 at that point in time. Remaining capacity obtainer 203 may also obtain information indicating the total remaining capacity (kWh) of a plurality of electric storage devices 303.

Subsequently, remaining capacity obtainer 203 sends the information indicating the remaining capacity of each electric storage device 303 to controller 202 and threshold setter 204.

Threshold setter 204 sets the first threshold. More specifically, threshold setter 204 sets the first threshold by setting the initial value to the first threshold, or by updating the first threshold. Such threshold is used as a reference, with respect to which received energy is reduced. For example, threshold setter 204 increases the first threshold when the amount of decrease of each electric storage device 303 per unit time is greater than the second threshold. By increasing the received energy, threshold setter 204 prevents the remaining capacity of each electric storage device 303 from being exhausted and the received energy from substantially deviating from the first threshold.

More specifically, threshold setter 204 increases the first threshold by a predetermined amount when the amount of decrease of each electric storage device 303 per unit time is greater than the second threshold. For example, threshold setter 204 increases the first threshold by 5% of the first threshold, when the amount of decrease per unit time is greater than the second threshold. In this case, threshold setter 204 may give a greater increase to the first threshold as the difference is greater between the amount of decrease per unit time and the second threshold.

Alternatively, for example, threshold setter 204 may give a greater increase to the first threshold as the remaining capacity is lower or as the amount of decrease in the remaining capacity per unit time is greater. Threshold setter 204 may also give a smaller increase to the first threshold as the reducible amount of power consumed by load 302 is greater.

Note that the second threshold, which is compared against the amount of decrease of each electric storage device 303 per unit time, is a value that is predetermined as a value indicating a rapid decrease in the remaining capacity of electric storage device 303. Threshold setter 204 may adjust the second threshold. For example, threshold setter 204 may set the second threshold at or below the remaining capacity of each electric storage device 303. Threshold setter 204 may set the second threshold to a greater value as the remaining capacity of electric storage device 303 is higher. Stated differently, threshold setter 204 may set the second threshold to a smaller value as the remaining capacity of electric storage device 303 is lower.

Threshold setter 204 may also set the second threshold to a smaller value as the reducible amount of power consumed by load 302 is greater.

Threshold setter 204 may also adjust the first threshold on the basis of received energy. For example, threshold setter 204 may adjust the first threshold to a value that is greater than or equal to the mean value of the received energy over a predetermined period (e.g., one day). Threshold setter 204 may also adjust the first threshold, for example, to a value that is greater than or equal to the maximum value of the received energy over a predetermined time unit (e.g., 30 minutes) within a predetermined period (e.g., one year). Threshold setter 204 may also adjust the first threshold to a value that is greater than or equal to the value obtained by levelling out the peak value.

Threshold setter 204 may also set the initial value to the first threshold on the basis of received energy at the timing of starting the control of the received energy. For example, threshold setter 204 may set, as the initial value of the first threshold, the maximum value of the received energy over a predetermined time unit (e.g., 30 minutes) within a predetermined period (e.g., one day).

Also, threshold setter 204 may increase the initial value that is set on the basis of received energy, when the timing of starting the control of the received energy falls within a lean season, which is set as a period during which received energy is smaller than a reference value, and when such set lean season is shorter than a predetermined period. The lean season is, for example, a period corresponding to spring or autumn. An example of the predetermined period, with respect to which whether the set lean season is determined as shorter, is one month. The lean season may be set by each consumer.

Reducible amount obtainer 205 obtains a reducible amount of power consumed by load 302. For example, reducible amount obtainer 205 obtains, every five minutes, a reducible amount of power consumed by load 302 at that that point in time. Reducible amount obtainer 205 may obtain information indicating the total reducible amount of power (kWh) consumed by a plurality of loads 302. Subsequently, reducible amount obtainer 205 sends the information indicating the reducible amount of power consumed by load 302 to controller 202 and threshold setter 204.

Note that received power control device 200 may control the charge and discharge of each electric storage device 303, and may not control the power consumption of load 302. In such a case, received power control device 200 may not include reducible amount obtainer 205.

Figure 3:
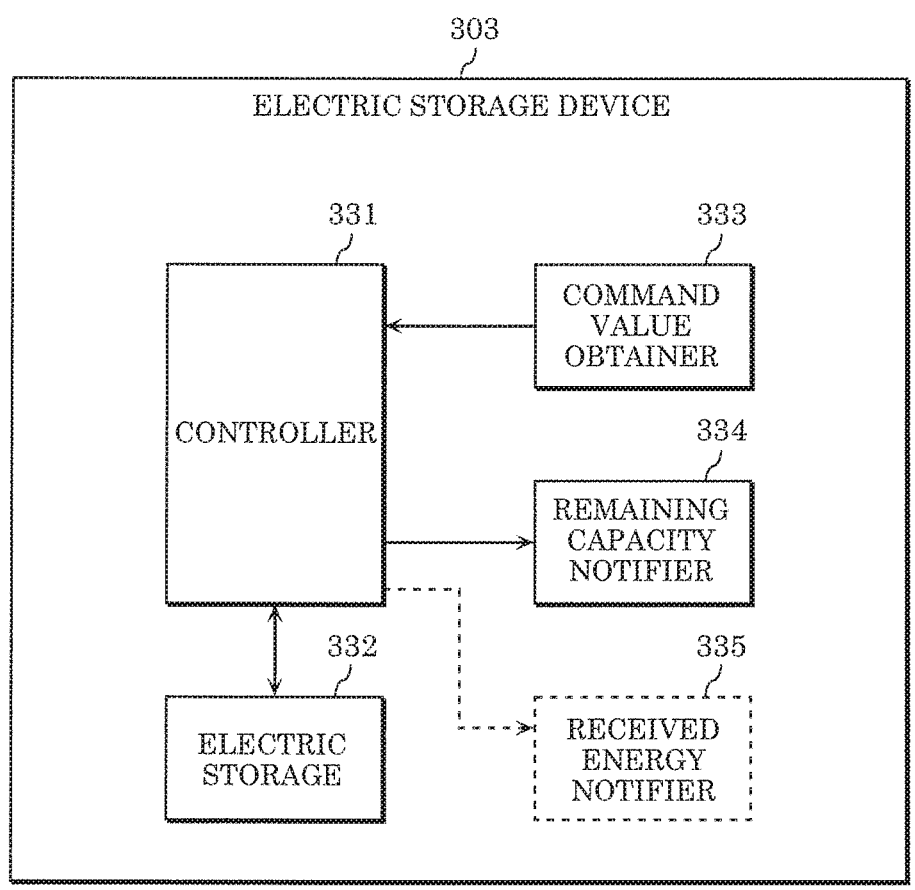
FIG. 3 is a block diagram showing the structure of an electric storage device according to the embodiment.

FIG. 3 is a block diagram showing the structure of electric storage device 303 shown in FIG. 1. As shown in FIG. 3, electric storage device 303 includes controller 331, electric storage 332, command value obtainer 333, and remaining capacity notifier 334. Electric storage device 303 may further include received energy notifier 335.

Controller 331 controls the overall operation of electric storage device 303. For example, controller 331 obtains a command value via command value obtainer 333, and controls the charge and discharge of electric storage 332 on the basis of the obtained command value. Controller 331 also detects the remaining capacity of electric storage 332, and provides notification of the remaining capacity via remaining capacity notifier 334. Controller 331 may further control the notification of received energy provided by received energy notifier 335. Controller 331 may perform the control of the charge and discharge, the control of the notification of the remaining capacity, and the control of the notification of received energy every five minutes.

Electric storage 332 is a structural component for storing power. Power is charged and discharged to and from electric storage 332 in accordance with the control performed by controller 331. For example, power supplied from the power system is charged to electric storage 332. Power discharged from electric storage 332 is supplied to load 302. Electric storage 332 may include a battery, an inverter, etc.

Command value obtainer 333 obtains a command value for charge and discharge. For example, command value obtainer 333 obtains a command value by receiving the command value from received power control device 200 through communication. Subsequently, command value obtainer 333 sends the command value to controller 331.

Remaining capacity notifier 334 provides notification of the remaining capacity of electric storage 332. More specifically, remaining capacity notifier 334 provides notification of the remaining capacity by sending information indicating the remaining capacity detected by controller 331. For example, remaining capacity notifier 334 provides notification of the remaining capacity to received power control device 200 by sending the information indicating the remaining capacity to received power control device 200 through communication.

Received energy notifier 335 provides notification of received energy. For example, received energy notifier 335 provides, to received power control device 200, notification of received energy by detecting the received energy at the interconnection point, and then by sending information indicating the received energy to received power control device 200 through communication. Note that received power control device 200 may detect the received energy without involvement by electric storage device 303. In such a case, electric storage device 303 may not include received energy notifier 335.

Figure 4:
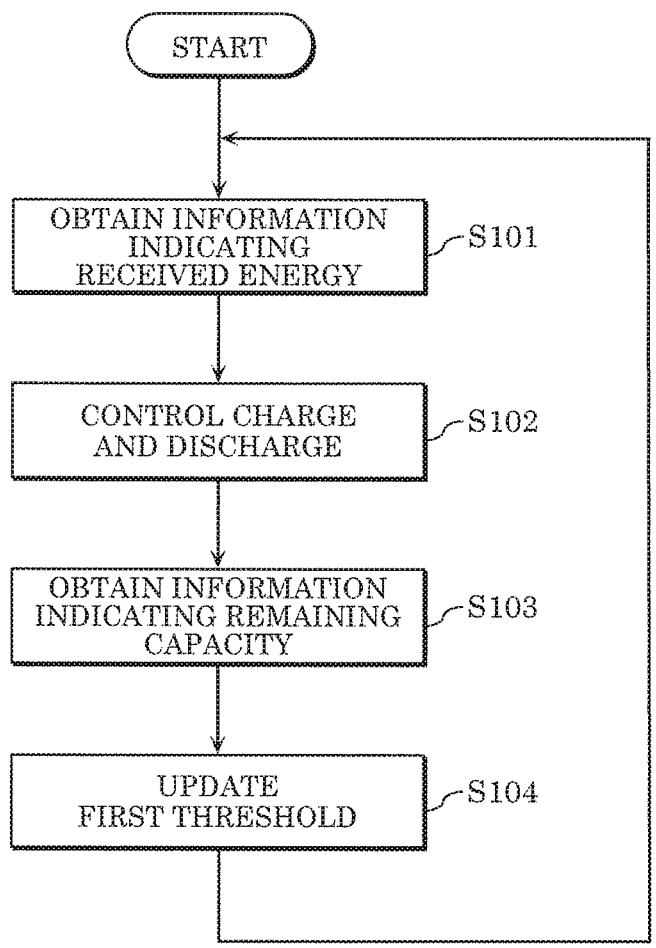
FIG. 4 is a flowchart of a first operation example of the received power control device according to the embodiment.

FIG. 4 is a flowchart of a first operation example of received power control device 200 shown in FIG. 2. Note that the initial value of the threshold for the received energy is already set.

First, received energy obtainer 201 of received power control device 200 obtains information indicating the received energy at the power reeving point (S101). For example, received energy obtainer 201 obtains the information indicating the received energy at transformer 101, which is a power receiving point, by measuring the amount of power received by transformer 101 from the power system.

Next, controller 202 of received power control device 200 controls the charge and discharge of each electric storage device 303 on the basis of the received energy (S102). For example, when the received energy exceeds the first threshold, controller 202 causes electric storage device 303 to discharge power by an amount that exceeds the first threshold, out of the received energy.

Next, remaining capacity obtainer 203 of received power control device 200 obtains information indicating the remaining capacity of each electric storage device 303 (S103). For example, remaining capacity obtainer 203 may obtain the information indicating the remaining capacity of electric storage device 303 from electric storage device 303 via communication line 103.

Next, threshold setter 204 of received power control device 200 updates the first threshold for the received energy as appropriate (S104). More specifically, when the amount of decrease in the remaining capacity per unit time exceeds the second threshold, threshold setter 204 increases the first threshold for the received energy.

Received power control device 200 repeats the above processes (S101 through S104). Through these processes, received power control device 200 reduces the received energy by causing each electric storage device 303 to discharge to prevent the received energy from exceeding the first threshold. When the amount of decrease in the remaining capacity per unit time exceeds the second threshold, received power control device 200 increases the first threshold to increase the received energy and decrease the amount of power to be discharged. This enables received power control device 200 to prevent each electric storage device 303 from being exhausted and thus the received energy from deviating from the first threshold.

Note that the order of the processes of the operation shown in FIG. 4 may be changed as appropriate. Also, one or more or all of these processes may be performed in parallel. These processes are periodically repeated, but may not necessarily be performed at constant intervals. Alternatively, these processes may be performed at different intervals.

Figure 5:
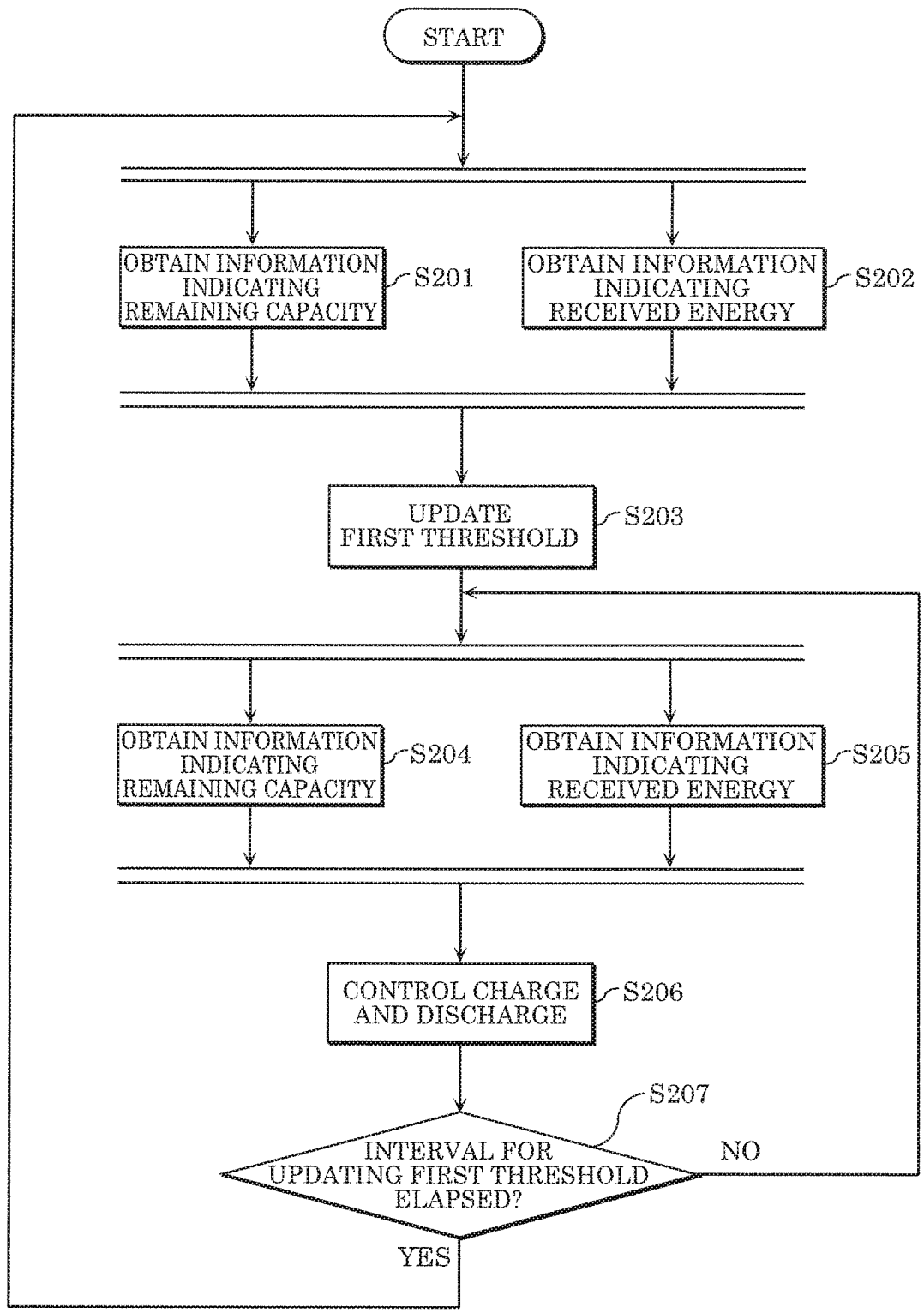
FIG. 5 is a flowchart of a second operation example of the received power control device according to the embodiment.

FIG. 5 is a flowchart of a second operation example of received power control device 200 shown in FIG. 2. The operation shown in FIG. 5 is a variation of the operation shown in FIG. 4 and is a specific example of the operation shown in FIG. 4.

First, remaining capacity obtainer 203 of received power control device 200 obtains information indicating the remaining capacity of each electric storage device 303 (S201). Furthermore, received energy obtainer 201 of received power control device 200 obtains information indicating the received energy at the power receiving point (S202). These items of information may be obtained in parallel.

Next, threshold setter 204 of received power control device 200 updates the first threshold as appropriate on the basis of the information indicating the remaining capacity and the information indicating the received energy at the power receiving point (S203). For example, threshold setter 204 increases the first threshold when the amount of decrease in the remaining capacity per unit time exceeds the second threshold.

In so doing, threshold setter 204 may give a greater increase to the first threshold as the remaining capacity is lower or the amount of decrease in the remaining capacity per unit time is smaller. Threshold setter 204 may also give a smaller increase to the first threshold as the reducible amount is greater.

Threshold setter 204 may also adjust the first threshold to a value that is greater than or equal to the maximum value of the received energy per predetermined time unit (e.g., 30 minutes) within a predetermined period (e.g., one year). Threshold setter 204 may also adjust the first threshold to a value that is greater than or equal to the mean value of the received energy over a predetermined period (e.g., one day).

Next, remaining capacity obtainer 203 of received power control device 200 obtains information indicating the remaining capacity of each electric storage device 303 (S204). Furthermore, received energy obtainer 201 of received power control device 200 obtains information indicating the received energy at the power receiving point (S205). These items of information may be obtained in parallel.

Next, controller 202 of received power control device 200 controls the charge and discharge of each electric storage device 303 on the basis of the remaining capacity and the received energy (S206).

For example, controller 202 causes electric storage device 303 to discharge when the remaining capacity is not exhausted and when the received energy exceeds the first threshold. Controller 202 may also cause electric storage device 303 to perform charge when the remaining capacity is not full and when the received energy is less than the first threshold. Controller 202 may also cause electric storage device 303 to discharge when the remaining capacity is not exhausted and when the received energy is likely to exceed the first threshold.

When the above conditions do not apply to the remaining capacity and the received energy, the charge and discharge of electric storage device 303 may be terminated.

When controlling the charge and discharge of a plurality of electric storage devices 303, controller 202 may cause a plurality of electric storage devices 303 to share the amount of power to be charged and discharged. For example, when the received energy estimated by Equation 1, etc. exceeds the first threshold, controller 202 allocates an amount of power, out of the estimated received energy, that exceeds the first threshold to a plurality of electric storage devices 303 as the amount of power to be discharged.

In so doing, controller 202 may allocate the amount of power to be discharged on the basis of the remaining capacity of each electric storage device 303. Controller 202 is required in some cases to limit the amount of power that can be discharged by electric storage device 303 to the amount that is less than or equal to the energy consumed by load 302 that corresponds to such electric storage device 303. As such, controller 202 may allocate the amount of power to be discharged on the basis of the energy consumed by load 302 that corresponds to electric storage device 303.

Controller 202 may also allocate the amount of power to be discharged, on the basis of a combination of the remaining capacity of each electric storage device 303 and the energy consumed by load 302 that corresponds to such electric storage device 303.

Subsequently, when time equivalent to the interval for updating the first threshold has elapsed (Yes in S207), the processes are repeated from the obtainment of information indicating the remaining capacity (S201), the obtainment of information indicating the received energy (S202), and the update of the first threshold (S203). The interval for updating the first threshold is, for example, 30 minutes.

Meanwhile, when time equivalent to the interval for updating the first threshold has not elapsed (No in S207), the obtainment of information indicating the remaining capacity (S204), the obtainment of information indicating the received energy (S205), and the control of charge and discharge (S206) are repeated. These processes (S204 through S206) are performed, for example, every five minutes.

Note that when controlling the charge and discharge of electric storage device 303, controller 202 may control the power consumption of load 302 within the reducible amount. Controller 202 may control the power consumption of load 302 at timing different from the timing of controlling the charge and discharge of electric storage device 303.

When updating the first threshold, threshold setter 204 may further update the second threshold. For example, threshold setter 204 may set the second threshold to a value that is less than or equal to the remaining capacity of each electric storage device 303. Threshold setter 204 may also set the second threshold to a smaller value as the remaining capacity is lower. Threshold setter 204 may further set the second threshold to a greater value as the reducible amount is greater. Threshold setter 204 may update the second threshold at timing different from the timing of updating the first threshold.

Figure 6:
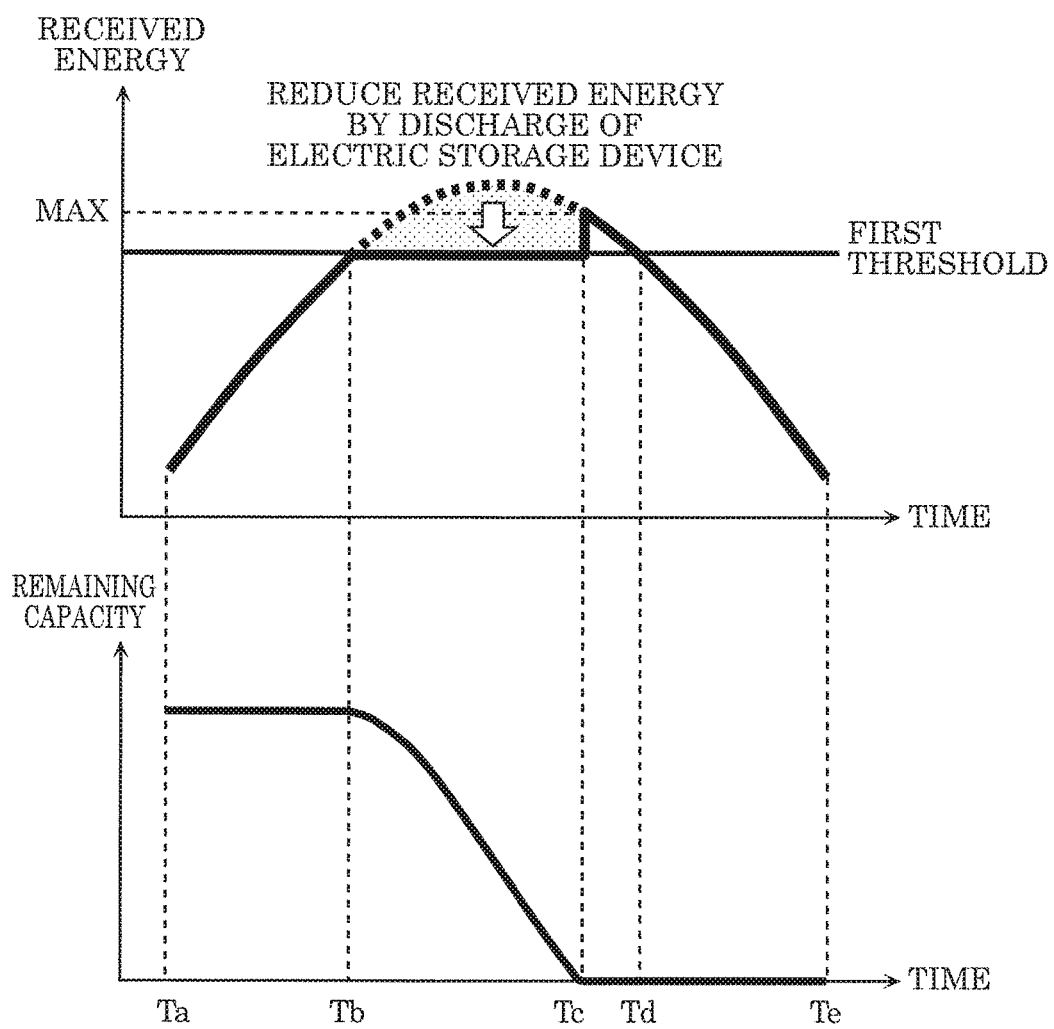
FIG. 6 is a graph showing the shift of the received energy in a first reference example.

FIG. 6 is a graph showing the shift of the received energy in a first reference example. More specifically, FIG. 6 illustrates the operation to be performed when the first threshold is not to be updated. In FIG. 6, the vertical axis indicates the received energy per predetermined time, and the horizontal axis indicates times. The predetermined time is, for example, 30 minutes. The doted lines in FIG. 6 indicate the received energy when no discharge has been performed. The shaded region in FIG. 6 indicates the received energy to be reduced by discharge. The following description assumes that received power control device 200 has not updated the first threshold.

From time Ta to time Tb in FIG. 6, the received energy is below the first threshold. As such, electric storage device 303 will not discharge, and thus the remaining capacity of electric storage device 303 remains constant.

After time Tb, the received energy exceeds the first threshold (the dotted lines in FIG. 6). As such, electric storage device 303 starts discharging. Consequently, the received energy will be reduced (the shaded region in FIG. 6). The remaining capacity of electric storage device 303 will decrease accordingly.

Subsequently, at time Tc, the remaining capacity of electric storage device 303 becomes exhausted. As such, electric storage device 303 detects the overcharge and stops charging after time Tc. Stated differently, although the received energy exceeds the first threshold from time Tc to time Td, electric storage device 303 will not discharge, and thus the received energy will not be reduced. Then, at time Tc, the received energy reaches the peak.

Figure 7:
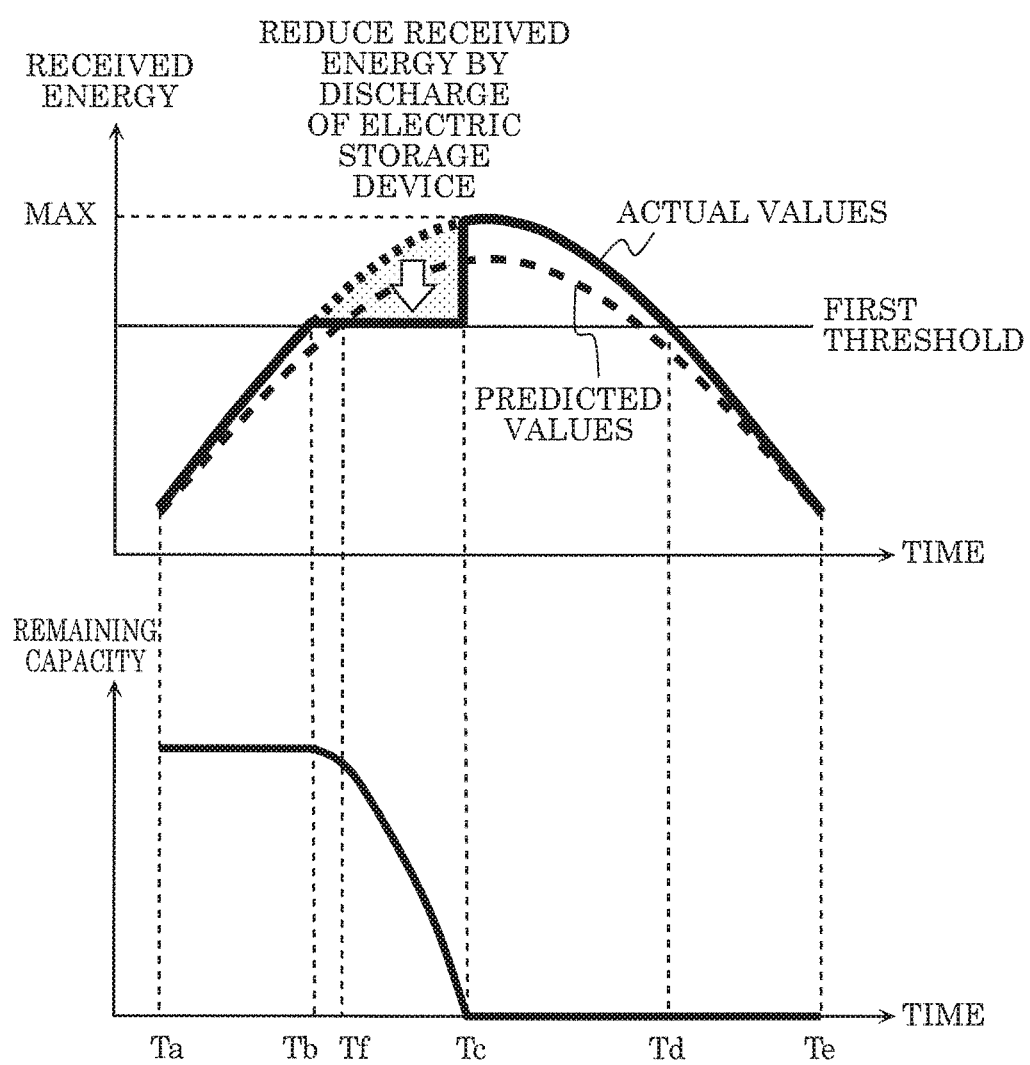
FIG. 7 is a graph showing the shift of the received energy in a second reference example.

FIG. 7 is a graph showing the shift of the received energy in a second reference example. Although the example of FIG. 7 is similar to the example of FIG. 6, FIG. 7 additionally shows an example case where the first threshold is defined on the basis of predicted values of the received energy.

When the first threshold is defined on the basis of the predicted values of the received energy, and such predicted values of the received energy are correct, the first threshold will be defined correctly. This leads to the possibility that the maximum value of the received energy will be controlled properly. Meanwhile, when the predicted values of the received energy are incorrect, the first threshold will not be defined correctly. This leads to the possibility that the maximum value of the received energy will not be controlled properly.

In the example of FIG. 7, which defines the first threshold on the basis of the predicted values of the received energy, the actual values of the received energy are higher than the predicted values of the received energy.

For example, the predicted values of the received energy are higher than the first threshold after time Tf. As such, electric storage device 303 is assumed to start discharging after time Tf.

However, the actual values of the received energy become higher than the first threshold after time Tb, which is earlier than predicted. As such, electric storage device 303 starts discharging from time Tb, which is earlier than assumed. Furthermore, the actual values of the received energy are higher than the predicted values of the received energy. Consequently, the amount of power to be discharged is greater than assumed.

For this reason, the remaining capacity of electric storage device 303 becomes exhausted at time Tc, which is earlier than assumed. Consequently, electric storage device 303 stops discharging after time Tc. Stated differently, although the received energy exceeds the first threshold from time Tc to time Td, electric storage device 303 will not discharge, and thus the received energy will not be reduced.

Consequently, in the example of FIG. 7, the maximum value of the received energy will not be reduced by discharge. Stated differently, in the example of FIG. 7, the maximum value of the received energy will not be reduced despite that discharge has been performed.

Figure 8:
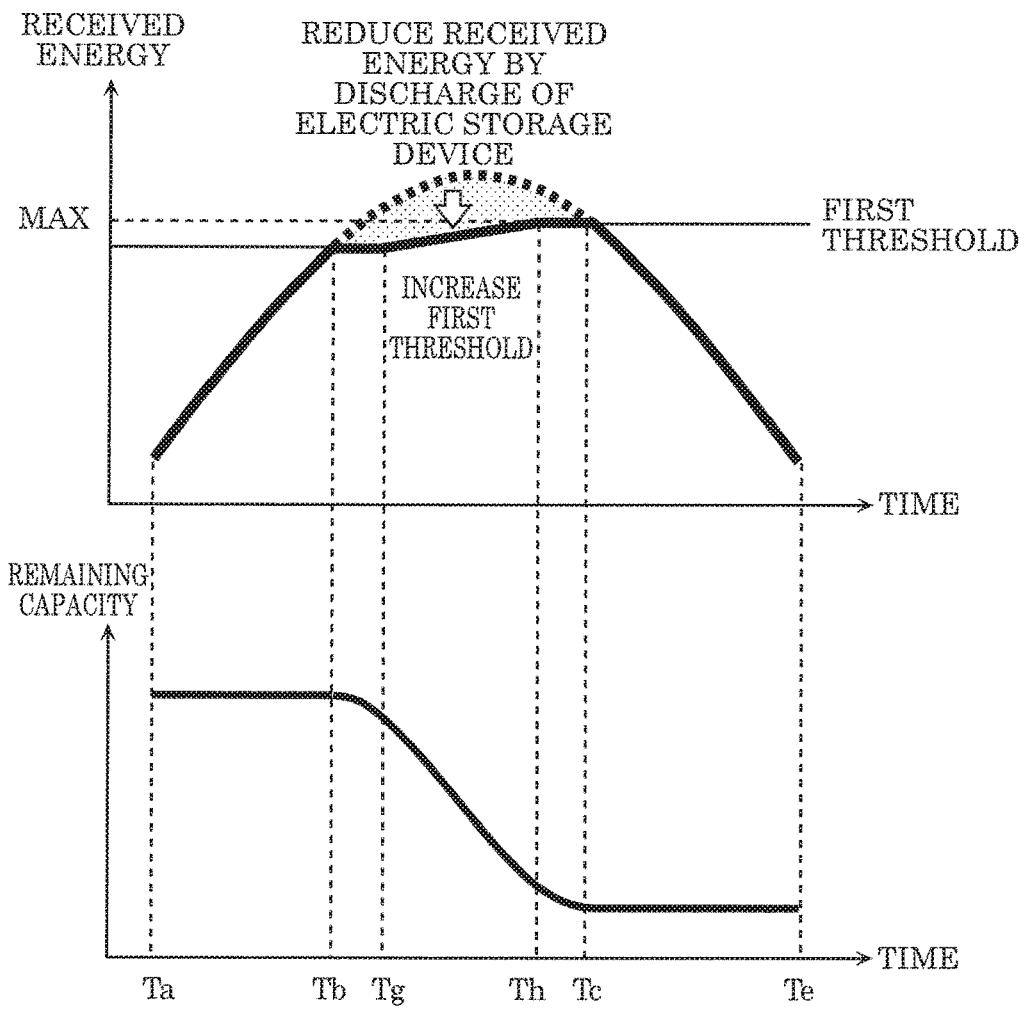
FIG. 8 is a graph showing the shift of the received energy in the embodiment.

FIG. 8 is a graph showing the shift of the received energy controlled by received power control device 200 shown in FIG. 2. More specifically, FIG. 8 illustrates the operation to be performed when the first threshold is to be updated. In FIG. 8, the vertical axis indicates the received energy per predetermined time and the horizontal axis indicates times. The predetermined time is, for example, 30 minutes. The doted lines in FIG. 8 indicate the received energy when no discharge has been performed. The shaded region in FIG. 8 indicates the received energy to be reduced by discharge.

From time Ta to time Tb in FIG. 8, the received energy is below the first threshold. As such, electric storage device 303 will not discharge, and thus the remaining capacity of electric storage device 303 remains constant.

After time Tb, the received energy exceeds the first threshold (the dotted lines in FIG. 8). As such, electric storage device 303 starts discharging. Consequently, the received energy will be reduced (the shaded region in FIG. 8). The remaining capacity of electric storage device 303 will decrease in conjunction with the discharge.

Subsequently, at time Tg, the amount of decrease in the remaining capacity per unit time exceeds the second threshold. As such, the first threshold increases. In the example of FIG. 8, since the amount of decrease in the remaining capacity per unit time keeps exceeding the second threshold from time Tg to time Th, the first threshold keeps increasing. Note that in the example of FIG. 8, the first threshold increases linearly at a constant rate from time Tg to time Th, but the first threshold may increase in a stepwise manner. More specifically, the first threshold may increase by a predetermined amount every 30 minutes from time Tg to time Th Subsequently, at time Th, the amount of decrease in the remaining capacity per unit time becomes less than or equal to the second threshold. As such, the first threshold stops increasing. Then, at time Tc, the received energy in the case where electric storage device 303 has not discharged becomes less than or equal to the first threshold. As such, electric storage device 303 stops discharging at time Tc. Electric storage device 303 will not discharge after time Tc, and thus the remaining capacity of electric storage device 303 remains constant.

As described above, in the example of FIG. 8, the first threshold increases when the amount of decrease in the remaining capacity per unit time exceeds the second threshold. This increases the received energy, while reducing the rise in the amount of power to be discharged. This prevents the remaining capacity of electric storage device 303 from being exhausted. Stated differently, discharge continues to be performed to reduce the received energy, which in turn prevents the maximum value of the received energy from becoming extremely high.

Note that in the example of FIG. 8, the first threshold increases when the amount of decrease in the remaining capacity per unit time exceeds the second threshold. More specifically, received power control device 200 increases the first threshold when the amount of decrease in the remaining capacity per unit time exceeds the second threshold.

Received power control device 200 may also update the first threshold on the basis of received energy. It is difficult to lower, for example, the maximum value of received energy to a value that is smaller than the mean value of the received energy over a predetermined period. This is because a greater amount of electric storage capacity is required in the case of reducing the received energy to a value that is lower than the mean value, compared to the case of reducing the received energy to the mean value. As such, received power control device 200 may adjust the first threshold to a value that is greater than or equal to the mean value of the received energy over the predetermined period.

More specifically, received power control device 200 may compare the current threshold against the mean value of the received energy over the predetermined period, and may set the mean value of the received energy over the predetermined period as a new first threshold when such mean value of the received energy over the predetermined period is greater than the current threshold.

It is supposedly difficult to lower, for example, the maximum value of the received energy to a value that is smaller than the maximum value of the received energy in the past. Moreover, when the power cost is defined on the basis of the maximum value of the received energy in the past, the reduction of the received energy to the amount less than the maximum value of the received energy in the past do not necessarily contribute to the reduction in the power cost. For this reason, received power control device 200 may adjust the first threshold to a value that is greater than or equal to the maximum value of the received energy in the past.

Here, the maximum value of the received energy in the past is, for example, the maximum value of the received energy per predetermined time unit over a predetermined period. More specifically, the maximum value of the received energy in the past may be, for example, the maximum value of the received energy in the unit of 30 minutes over the past one year.

Then, received power control device 200 may compare the current threshold against the maximum value of the received energy in the past, and may set the maximum value of the received energy in the past as a new first threshold, when the maximum value of the received energy in the past is greater than the current threshold.

Alternatively, received power control device 200 may also adjust the first threshold to a value that is greater than or equal to the value obtained by levelling out the peak value. This will be more specifically described with reference to FIG. 9.

Figure 9:
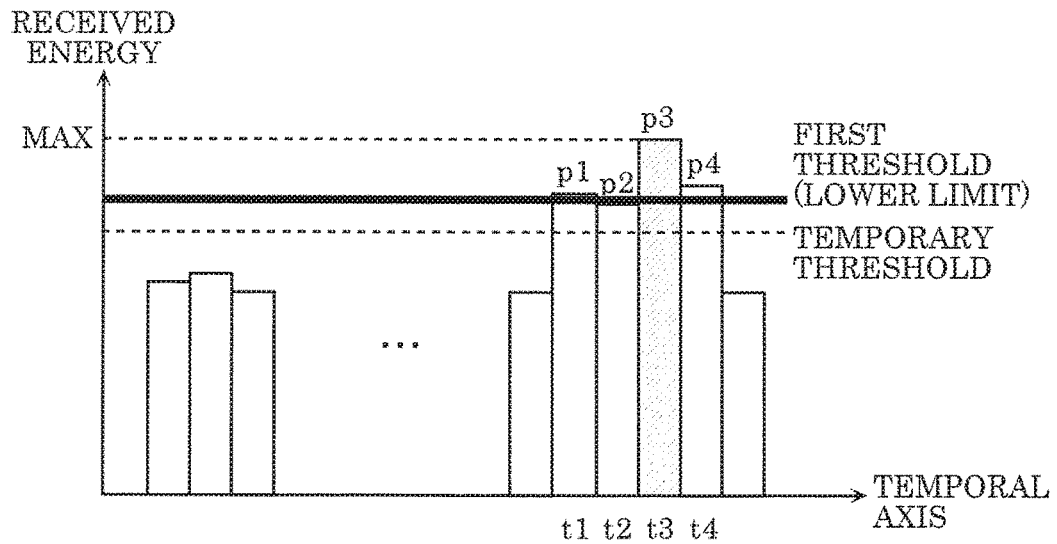
FIG. 9 is a graph for describing an example of setting a first threshold according to the embodiment.

FIG. 9 is a graph for describing an example in which received power control device 200 shown in FIG. 2 sets the first threshold.

First, threshold setter 204 of received power control device 200 identifies, from a predetermined period in the past (e.g., the previous one day), a time (time slot) at which the received energy reaches its peak. In the example of FIG. 9, threshold setter 204 identifies time t3 as the peak time of the received energy.

Then, assuming that the received energy (p3) at time t3 is to be reduced by discharging the amount of power corresponding to the remaining capacity at time t3, threshold setter 204 determines received energy resulted from such reduction as a temporary threshold. Stated differently, threshold setter 204 determines the temporary threshold by the following Equation 2:

$$\text{Temporary threshold} = \text{peak received energy} - \text{dischargeable energy} \quad \text{(Equation 2)}$$

In Equation 2, peak received energy corresponds to received energy p3 at time t3, and dischargeable energy corresponds to the amount of power that can be discharged at the peak time, which corresponds to the amount of power to be discharged corresponding to the remaining capacity at time t3.

Next, threshold setter 204 identifies times during which the temporary threshold is continuously exceeded. In the example of FIG. 9, times t1 thorough t4 are identified as the times during which the temporary threshold is continuously exceeded. Subsequently, threshold setter 204 determines the first threshold by the following Equation 3:

$$\text{First threshold} = (\Sigma(p_i - \text{temporary threshold}) - \text{dischargeable energy}) \div \text{number of times} + \text{temporary threshold} \quad \text{(Equation 3)}$$

In Equation 3, pi corresponds to, for example, received energies p1 through p4 at times t1 through t4, and number of times is, for example, the number of times t1 through t4, which is four. Note that Equation 3 can be modified to the following Equation 4:

$$\text{First threshold} = (\Sigma p_i - \text{dischargeable energy}) \div \text{number of times} \quad \text{(Equation 4)}$$

More specifically, threshold setter 204 determines, as the first threshold, the value that is obtained by subtracting, from the mean value of the received energy at times during which the received energy continuously exceeds the temporary threshold, the value obtained by averaging the dischargeable energy by the number of times during which the received energy continuously exceeds the temporary threshold. Equation 3 and Equation 4 are substantially the same. Threshold setter 204 may determine the first threshold by another equation that is considered as substantially the same as Equation 3 or Equation 4.

Threshold setter 204 may also calculate, as the lower limit of the first threshold, the first threshold given by Equation 3, Equation 4 or another equation. In such a case, threshold setter 204 may adjust the first threshold to a value that is greater than or equal to the lower limit of the first threshold.

More specifically, threshold setter 204 compares the current threshold against the first threshold given by Equation 3, Equation 4, or another equation. When the first threshold given by Equation 3, Equation 4, or another equation is greater than the current threshold, threshold setter 204 may then set the first threshold given by Equation 3, Equation 4, or another equation as a new first threshold.

Figure 10:
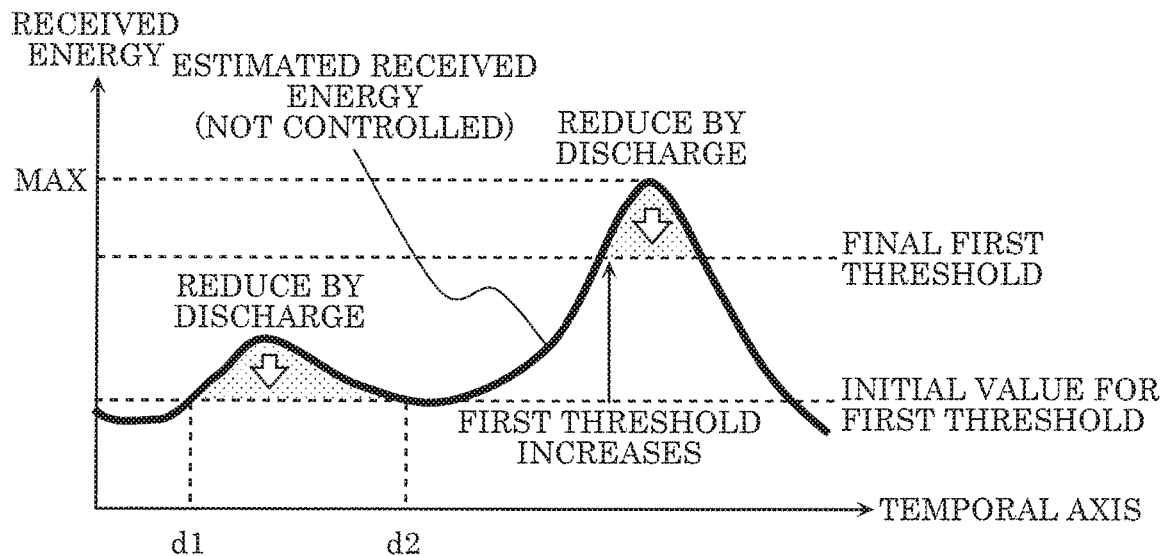
FIG. 10 is a conceptual diagram illustrating an initial value of a first threshold in a third reference example.
Figure 11:
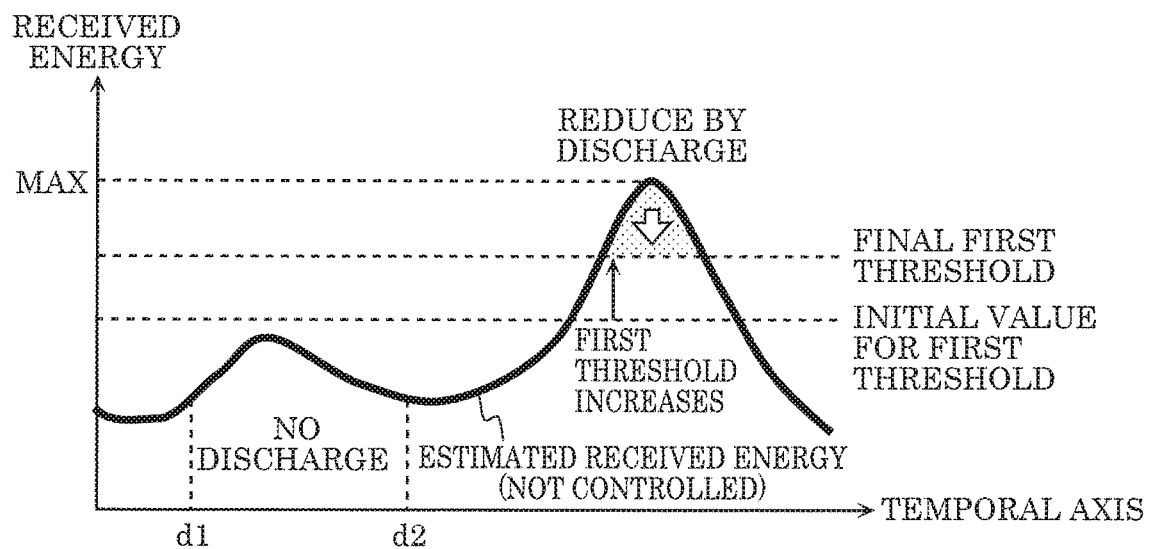
FIG. 11 is a conceptual diagram illustrating an initial value of the first threshold according to the embodiment.

With reference to FIG. 10 and FIG. 11, the following describes the initial value of the first threshold for received energy.

FIG. 10 is a conceptual diagram illustrating the initial value of the first threshold in a third reference example. In FIG. 10, the vertical axis indicates the received energy, and the horizontal axis corresponds to the temporal axis, which indicates a relatively long period of time of one year, for example. The bold line in FIG. 10 indicates the estimated received energy that is obtained on the assumption that the received energy has not been reduced by discharge.

In this example, the control of the received energy starts at time point d1, and the initial value of the first threshold for the received energy is set (defined) on the basis of the received energy at time point d1. Time d1 is included in a lean season. The lean season is set as a period during which received energy is smaller than a reference value. The lean season corresponds to, for example, spring or autumn.

In this example, the initial value of the first threshold is set on the basis of the received energy corresponding to time point d1 included in a lean season as described above. As such, a relatively small value is set as the initial value of the first threshold.

The received energy exceeds the first threshold from time point d1 to time point d2, and thus the received energy will be reduced by discharge. Thereafter, however, the first threshold increases with an increase in the received energy. Consequently, the final first threshold exceeds the maximum value of the received energy from time point d1 to time point d2.

More specifically, it is difficult to maintain, for a long period of time, the received energy at a value that is smaller than or equal to the initial value that has been set low. Moreover, when the period from time point d1 to time point d2 is short (e.g., one month or shorter), it is ineffective in the long term to control the peak value of the received energy. Stated differently, it is considered useless to perform discharge from time point d1 to time point d2 and to control the received energy from time point d1 to time point d2. In view of this, received power control device 200 sets a relatively high value as the initial value of the first threshold in a short lean season. For example, threshold setter 204 may increase the initial value by 30% of the initial value that is set on the basis of the received energy, or may increase the initial value in accordance with a ratio between the received energy of a lean season and the received energy of a period of transition. Threshold setter 204 may also change the degree at which the initial value is increased, depending on whether the time point of starting the control of the received energy is at the beginning, in the middle, or at the end of the lean season.

Meanwhile, when the period from time point d1 to time point d2 is long (e.g., one moth or longer), electric bills for the period from time point d1 to time point d2 can be reduced, and thus it is effective to set a relatively small value as the initial value of the first threshold in accordance with the received energy.

FIG. 11 is a conceptual diagram that illustrates the initial value of the first threshold set by received power control device 200 shown in FIG. 2, and that shows an example case where the period from time point d1 to time point d2 is short. In FIG. 11, as in the case of FIG. 10, the vertical axis indicates the received energy, and the horizontal axis corresponds to the temporal axis, which indicates a relatively long period of time of one year, for example. The bold line in FIG. 11 indicates the estimated received energy that is determined on the assumption that the received energy has not been reduced by discharge.

In the example of FIG. 11, as in the case of the example of FIG. 10, the control of the received energy starts at time point d1, and threshold setter 204 of received power control device 200 sets (defines) the initial value of the first threshold for the received energy on the basis of the received energy at time point d1. For example, threshold setter 204 may set, as the initial value of the first threshold, the maximum value of the received energy over a predetermined time unit (e.g., 30 minutes) within a predetermined period (e.g., the past one day).

Note that since the period from time point d1 to time point d2 is short, threshold setter 204 increases the initial value that is set on the basis of the received energy.

As shown in FIG. 11, threshold setter 204 sets a relatively high value as the initial value of the first threshold, and thus the received energy does not exceed the first threshold from time point d1 to time point d2. This reduces a wasteful discharge, which in turn retards the cycle deterioration of electric storage device 303.

Stated differently, threshold setter 204 appropriately sets the initial value of the first threshold at the start of controlling the received energy, which allows for an appropriate control of the charge and discharge of electric storage device 303, and thus for an appropriate control of the received energy. Furthermore, threshold setter 204 appropriately updates the initial value of the first threshold when the control of the received energy is in operation, which allows for an appropriate control of the charge and discharge of electric storage device 303, and thus for an appropriate control of the received energy.

As described above, received power control device 200 according to the present embodiment causes electric storage device 303 to discharge to prevent the received energy per predetermined time from exceeding the first threshold. Received power control device 200 periodically obtains the remaining capacity of each electric storage device 303, and increases the first threshold when the amount of decrease in the remaining capacity per unit time exceeds the second threshold. This prevents the remaining capacity of electric storage device 303 from being exhausted, and thus enables discharge to be continuously performed. Consequently, the peak received energy is reduced, or more specifically, the received energy is appropriately controlled.

Note that the amount of decrease in the remaining capacity per unit time may be referred to as the rate of decrease in the remaining capacity per unit time, or may be referred to as the speed of decrease in the remaining capacity.

Also note that, five minutes, thirty minutes, one day, one month, one year, and other periods used in the above description are examples of the predetermined time, the predetermined period, etc., and thus may be changed as appropriate. Also, any unit time may be applied to the unit time used in the above description.

Also, threshold setter 204 of received power control device 200 presented in the embodiment may include a threshold initialization unit and a threshold updating unit. In such a case, the threshold initialization unit may set the initial value of the first threshold, and the threshold updating unit may update the first threshold.

Received power control device 200 according to the present invention has been described above on the basis of the embodiment, etc., but the present embodiment is not limited to such embodiment, etc. The present invention thus includes an embodiment achieved by making those modifications and alternations to the above embodiment, etc. that can be conceived by those skilled in the art as well as another embodiment achieved by combining any structural components in the above embodiment, etc.

For example, a process performed by a specified structural component may be performed by another structural component. Also, the processing order may be changed, or a plurality of processes may be performed in parallel.

Note that the present invention is embodied not only as received power control device 200, but also as a method that includes steps (processes) performed by the structural components of received power control device 200.

Such steps may be performed by, for example, a computer (computer system). The present invention may also be embodied as a program that causes a computer to perform the steps included in the method. The present invention may further be embodied as a non-temporary computer-readable recording medium, such as a CD-ROM, storing such program.

When the present invention is embodied as a program (software), for example, each step is performed by executing the program by use of hardware resources of a computer such as a CPU, a memory, and an input/output circuit. Stated differently, each step is performed by the CPU obtaining data from the memory or the input/output circuit for calculation, and then outputting the calculation result to the memory or the input/output circuit.

Furthermore, each of the structural components included in received power control device 200, etc. may be embodied as a dedicated or general-purpose circuit. The structural components may be embodied as a single circuit, or may be embodied as a plurality of circuits.

Also, a plurality of structural components included in received power control device 200, etc. may be embodied as a large-scale integration (LSI), which is an integrated circuit (IC). Each of these structural components may take the form of an individual chip, or one or more or all of these structural elements may be encapsulated into a single chip. An LSI is referred to as a system LSI, a super LSI, or an ultra LSI, depending on the degree of integration.

Such IC is not limited to an LSI, and thus may be embodied as a dedicated circuit or a general-purpose processor. Alternatively, a programmable field programmable gate array (FPGA), or a reconfigurable processor, which allows for reconfiguration of the connection and the setting of circuit cells inside an LSI, may be employed.

Furthermore, when a new IC technology that replaces the LSI emerges thanks to the progress in the semiconductor technology or another derivative technology, such new technology may off course be employed to integrate the structural components included in received power control device 200 into an IC.

Finally, a plurality of aspects of received power control device 200, etc. will be described as examples. These aspects may be combined as appropriate. Also, any structure and others described in the above embodiment, etc. may be added.

(First Aspect)

Received power control device 200 according to one aspect of the present invention is received power control device 200 that performs control of received energy, which is an amount of power received from a power system per predetermined time at a power receiving point to which load 302 and electric storage device 303 are electrically connected, received power control device 200 performing the control by controlling charge and discharge of at least electric storage device 303. Such received power control device 200 includes received energy obtainer 201, controller 202, remaining capacity obtainer 203, and threshold setter 204.

Received energy obtainer 201 periodically obtains information indicating the received energy. Controller 202 causes at least electric storage device 303 to discharge to prevent the received energy from exceeding a first threshold. Remaining capacity obtainer 203 periodically obtains information indicating a remaining capacity of electric storage device 303. Threshold setter 204 increases the first threshold when an amount of decrease in the remaining capacity per unit time exceeds a second threshold.

This increases the received energy, while reducing the amount of power to be discharged, when the amount of decrease in the remaining capacity per unit time exceeds the second threshold. This prevents the remaining capacity of electric storage device 303 from being exhausted, and discharge continues to be performed. This thus prevents the maximum value of the received energy from becoming extremely high, i.e., the received energy will be appropriately reduced.

(Second Aspect)

For example, threshold setter 204 may further adjust the first threshold to a value that is greater than or equal to a maximum value of the received energy over a predetermined period. This enables the first threshold to be appropriately adjusted on the basis of the maximum value of the received energy.

(Third Aspect)

For example, threshold setter 204 may further adjust the first threshold to a value that is greater than or equal to a mean value of the received energy over a predetermined period. This enables the first threshold to be appropriately adjusted on the basis of the mean value of the received energy.

(Fourth Aspect)

For example, threshold setter 204 may further derive a temporary threshold that is determined by subtracting, from a maximum value of the received energy over a predetermined period, dischargeable energy corresponding to the remaining capacity at a time at which the received energy reaches the maximum value. Then, threshold setter 204 may further derive, within the predetermined period, an excess-period that is a period including the time at which the received energy reaches the maximum value and that is a period during which the received energy continuously exceeds the temporary threshold.

Then, threshold setter 204 may adjust the first threshold to a value that is greater than or equal to energy determined by subtracting, from a mean value of the received energy over the excess-period, a value obtained by averaging the dischargeable energy by the excess-period This enables the first threshold to be appropriately adjusted in accordance with the maximum value of the received energy, the dischargeable energy, and the period during which the received energy is high.

(Fifth Aspect)

For example, threshold setter 204 may further set the second threshold to a value that is less than or equal to the remaining capacity. This enables the second threshold to be appropriately set on the basis of the remaining capacity to prevent the second threshold from becoming excessively high.

(Sixth Aspect) For example, threshold setter 204 may further set the second threshold to a smaller value as the remaining capacity is lower. This enables the second threshold to be appropriately set in accordance with the level of the remaining capacity.

(Seventh Aspect)

For example, threshold setter 204 may further give a greater increase to the first threshold as the remaining capacity is lower or as an amount of decrease in the remaining capacity per unit time is greater. This enables the second threshold to be appropriately set in accordance with the level of the remaining capacity or the changes in the level of the remaining capacity. This thus prevents the remaining capacity from being exhausted.

(Eighth Aspect)

For example, received power control device 200 may further include reducible amount obtainer 205 that obtains a reducible amount of power consumed by load 302, and controller 202 may control the power consumed by load 302 within the reducible amount. This enables received power control device 200 to regulate the power consumption of load 302 to prevent the received energy from exceeding the first threshold.

(Ninth Aspect)

For example, threshold setter 204 may further set the second threshold to a greater value as the reducible amount is greater. This enables received power control device 200 to prevent an increase of the first threshold from occurring, in the case where an adequate reduction in the received energy is achieved by reducing the power consumption of load 302. This thus allows received power control device 200 to prevent an increase of the received energy.

(Tenth Aspect)

For example, threshold setter 204 may further give a smaller increase to the first threshold as the reducible amount is greater. This enables received power control device 200 to reduce an increase (the amount of increase) of the first threshold, in the case where an adequate reduction in the received energy is achieved by reducing the power consumption of load 302. This thus allows received power control device 200 to prevent an increase of the received energy.

(Eleventh Aspect)

For example, threshold setter 204 may set an initial value to the first threshold based on the received energy when the control of the received energy starts. Then, threshold setter 204 may increase the initial value that is set to the first threshold based on the received energy, when timing at which the control of the received energy starts falls within a lean season, which is set as a period during which the received energy is smaller than a reference value, and when the lean season is shorter than a predetermined period. This enables the initial value of the first threshold to be appropriately set in accordance with the timing at which the control of the received energy starts.

(Twelfth Aspect)

For example, threshold setter 204 may set, as an initial value of the first threshold, a maximum value of the received energy over a predetermined period. This enables the initial value of the first threshold to be appropriately set in accordance with the maximum value of the received energy.

(Thirteenth Aspect)

The received power control method according to another aspect of the present invention is a received power control method for performing control of received energy, which is an amount of power received from a power system per predetermined time at a power receiving point to which load 302 and electric storage device 303 are electrically connected, the received power control method being intended for performing the control by controlling charge and discharge of at least electric storage device 303. Such received power control method includes obtainment of received energy (S101), controlling (S102), obtainment of a remaining capacity (S103), and setting of a threshold (S104).

In the obtainment of received energy (S101), information indicating the received energy is periodically obtained. In the controlling (S102), electric storage device 303 is caused to discharge to prevent the received energy from exceeding a first threshold. In the obtainment of a remaining capacity (S103), information indicating a remaining capacity of electric storage device 303 is periodically obtained. In the setting of a threshold (S104), the first threshold is increased when an amount of decrease in the remaining capacity per unit time exceeds a second threshold.

This increases the received energy, while reducing the rise in the amount of power to be discharged when the amount of decrease in the remaining capacity per unit time exceeds the second threshold. This prevents the remaining capacity of electric storage device 303 from being exhausted, and discharge continues to be performed. This thus prevents the maximum value of the received energy from becoming extremely high, i.e., the received energy will be appropriately reduced.

REFERENCE MARKS IN THE DRAWINGS 200 received power control device
201 received energy obtainer
202 controller
203 remaining capacity obtainer
204 threshold setter
205 reducible amount obtainer
302 load
303 electric storage device

The invention claimed is:

1. A received power control device that performs control of received energy, which is an amount of power received from a power system per predetermined time at a power receiving point to which a load and an electric storage device are electrically connected, the received power control device performing the control by controlling charge and discharge of at least the electric storage device, the received power control device comprising:
  a received energy obtainer that periodically obtains information indicating the received energy;
  a controller that causes at least the electric storage device to discharge to prevent the received energy from exceeding a first threshold corresponding to a value the received energy is not to exceed;

a remaining capacity obtainer that periodically obtains information indicating a remaining capacity of the electric storage device; and a threshold setter that increases the first threshold when an amount of decrease in the remaining capacity per unit time exceeds a second threshold corresponding to an acceptable range of a rate of discharge of the electric storage device.

2. The received power control device according to claim 1, wherein the threshold setter further adjusts the first threshold to a value that is greater than or equal to a maximum value of the received energy over a predetermined period.

3. The received power control device according to claim 1, wherein the threshold setter further adjusts the first threshold to a value that is greater than or equal to a mean value of the received energy over a predetermined period.

4. The received power control device according to claim 1, wherein the threshold setter further derives a temporary threshold that is determined by subtracting, from a maximum value of the received energy over a predetermined period, dischargeable energy corresponding to the remaining capacity at a time at which the received energy reaches the maximum value, derives, within the predetermined period, an excess-period that is a period including the time at which the received energy reaches the maximum value and that is a period during which the received energy continuously exceeds the temporary threshold, and adjusts the first threshold to a value that is greater than or equal to energy determined by subtracting, from a mean value of the received energy over the excess-period, a value obtained by averaging the dischargeable energy by the excess-period.

5. The received power control device according to claim 1, wherein the threshold setter further sets the second threshold to a value that is less than or equal to the remaining capacity.

6. The received power control device according to claim 1, wherein the threshold setter further sets the second threshold to a smaller value as the remaining capacity is lower.

7. The received power control device according to claim 1, wherein the threshold setter further gives a greater increase to the first threshold as the remaining capacity is lower or as an amount of decrease in the remaining capacity per unit time is greater.

8. The received power control device according to claim 1, further comprising a reducible amount obtainer that obtains a reducible amount of power consumed by the load, and the controller controls the power consumed by the load within the reducible amount.

9. The received power control device according to claim 8, wherein the threshold setter further sets the second threshold to a greater value as the reducible amount is greater.

10. The received power control device according to claim 8, wherein the threshold setter further gives a smaller increase to the first threshold as the reducible amount is greater.

11. The received power control device according to claim 1, wherein the threshold setter sets an initial value to the first threshold based on the received energy when the control of the received energy starts, and increases the initial value that is set to the first threshold based on the received energy, when timing at which the control of the received energy starts falls within a period during which the received energy is smaller than a reference value, and when the period is shorter than a predetermined period.

12. The received power control device according to claim 1, wherein the threshold setter sets, as an initial value of the first threshold, a maximum value of the received energy over a predetermined period.

13. A received power control method for performing control of received energy, which is an amount of power received from a power system per predetermined time at a power receiving point to which a load and an electric storage device are electrically connected, the received power control method being intended for performing the control by controlling charge and discharge of at least the electric storage device, the received power control method comprising:

periodically obtaining information indicating the received energy;

causing at least the electric storage device to discharge to prevent the received energy from exceeding a first threshold corresponding to a value the received energy is not to exceed;

periodically obtaining information indicating a remaining capacity of the electric storage device; and increasing the first threshold when an amount of decrease in the remaining capacity per unit time exceeds a second threshold corresponding to an acceptable range of a rate of discharge of the electric storage device.

* * * * *